United States Patent
Nagandla

(10) Patent No.: US 12,101,408 B2
(45) Date of Patent: Sep. 24, 2024

(54) DISTRIBUTION OF ONE-TIME PASSWORDS FOR MULTI-FACTOR AUTHENTICATION VIA BLOCKCHAIN

(71) Applicant: Okta, Inc., San Francisco, CA (US)

(72) Inventor: Srinivasa Nagandla, Fremont, CA (US)

( * ) Notice: Subject to any disclaimer, the term of this patent is extended or adjusted under 35 U.S.C. 154(b) by 346 days.

(21) Appl. No.: 17/556,941

(22) Filed: Dec. 20, 2021

(65) Prior Publication Data

US 2023/0198767 A1    Jun. 22, 2023

(51) Int. Cl.
H04L 9/32    (2006.01)
H04L 9/00    (2022.01)
H04L 9/30    (2006.01)

(52) U.S. Cl.
CPC .......... *H04L 9/3228* (2013.01); *H04L 9/3073* (2013.01); *H04L 9/3213* (2013.01); *H04L 9/3239* (2013.01); *H04L 9/50* (2022.05)

(58) Field of Classification Search
CPC ... H04L 9/3228; H04L 9/3073; H04L 9/3213; H04L 9/3239; H04L 9/50
See application file for complete search history.

(56) References Cited

U.S. PATENT DOCUMENTS

| | | | |
|---|---|---|---|
| 2008/0168543 A1* | 7/2008 | von Krogh | H04L 9/12 726/9 |
| 2015/0067793 A1* | 3/2015 | Robison, Jr. | H04L 63/083 726/5 |
| 2019/0361917 A1* | 11/2019 | Tran | H04W 12/108 |
| 2020/0005296 A1* | 1/2020 | Green | H04L 9/3297 |
| 2022/0070002 A1* | 3/2022 | Turner | H04L 9/3247 |

OTHER PUBLICATIONS

Frankenfield, J., "Blockchain Wallet," Investopedia, Aug. 16, 2021, pp. 1-8, [Online] [Retrieved from the Wayback Machine] <URL: https://web.archive.org/web/20211003063719/https://www.investopedia.com/terms/b/blockchain-wallet.asp>.

* cited by examiner

*Primary Examiner* — Abiy Getachew
(74) *Attorney, Agent, or Firm* — Holland & Hart LLP

(57) ABSTRACT

A decentralized secure repository is used as a medium for distribution of a one-time password (OTP) from an authentication system to a user's client device. End-to-end encryption of the OTP is provided: the OTP is both stored encrypted at rest on the decentralized secure repository, and is also encrypted when it is transmitted over computer networks between different systems, thereby thwarting attempts at eavesdropping. The decentralized secure repository itself also has a number of properties that enhance security of the OTP, such as tamper-proofness and auditability. The decentralized secure repository may be implemented with techniques such as a blockchain protocol.

12 Claims, 3 Drawing Sheets

DISTRIBUTION OF ONE-TIME PASSWORDS FOR MULTI-FACTOR AUTHENTICATION VIA BLOCKCHAIN

FIELD OF ART

The present invention generally relates to the field of software systems, and more specifically, to facilitating the use of one-time passwords (OTP) for multi-factor authentication.

BACKGROUND

Multi-factor authentication (MFA) systems strengthen the security of user access to electronic resources by requiring multiple different types of distinct data ("factors"), such as passwords, hardware tokens or other devices providing unique identifiers, biometric data such as fingerprint or iris data, or the like. One-time passwords are one common type of factor, in which an authentication system provides different passwords for the same user at different times and/or on different systems.

Although one-time passwords do mitigate risks such as password replay, their conventional implementations nonetheless still have a number of other shortcomings. For example, the medium used to transmit the one-time password to the user (e.g., email or text messages) is typically unencrypted, and hence vulnerable to eavesdropping. A conventional system used to distribute the one-time password constitutes a single point of attack, so that successful attacks such as eavesdropping or data tampering become possible. Another drawback of conventional OTP systems is a certain loss of privacy, in that they require registration of contact information (such as email address, or phone number for texts) with the OTP provider, which successful attackers can then obtain. The use of custom hardware and software devices may mitigate some of these deficiencies, but users with only standard devices are unable to take advantage of it. Conventional systems additionally typically lack a way to determine when users' one-time passwords have been used, thus preventing users from determining whether unauthorized parties have managed to gain access to the system and obtain one-time passwords in their names.

SUMMARY

A decentralized secure repository is used as a medium for distribution of a one-time password (OTP) from an authentication system to a user's client device. End-to-end encryption of the OTP is provided: the OTP is both stored encrypted at rest on the decentralized secure repository, and is also encrypted when it is transmitted over computer networks between different systems, thereby thwarting attempts at eavesdropping. The decentralized secure repository itself also has a number of properties that enhance security of the OTP. For example, the decentralized secure repository is made up of a number of different systems ("nodes") controlled by different organizations, and an attacker would need to successfully attack multiple ones of the nodes (e.g., a majority thereof) in order to gain the ability to tamper with the OTP system. In some embodiments, the decentralized secure repository additionally provides the ability of users to "audit" the use of the system—that is, to obtain a log or other information about the actions that have been performed on the decentralized secure repository. Accordingly, if an attacker has somehow managed to use the decentralized secure repository (e.g., to obtain an OTP for the user), the user is able to determine that by auding the decentralized secure repository.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
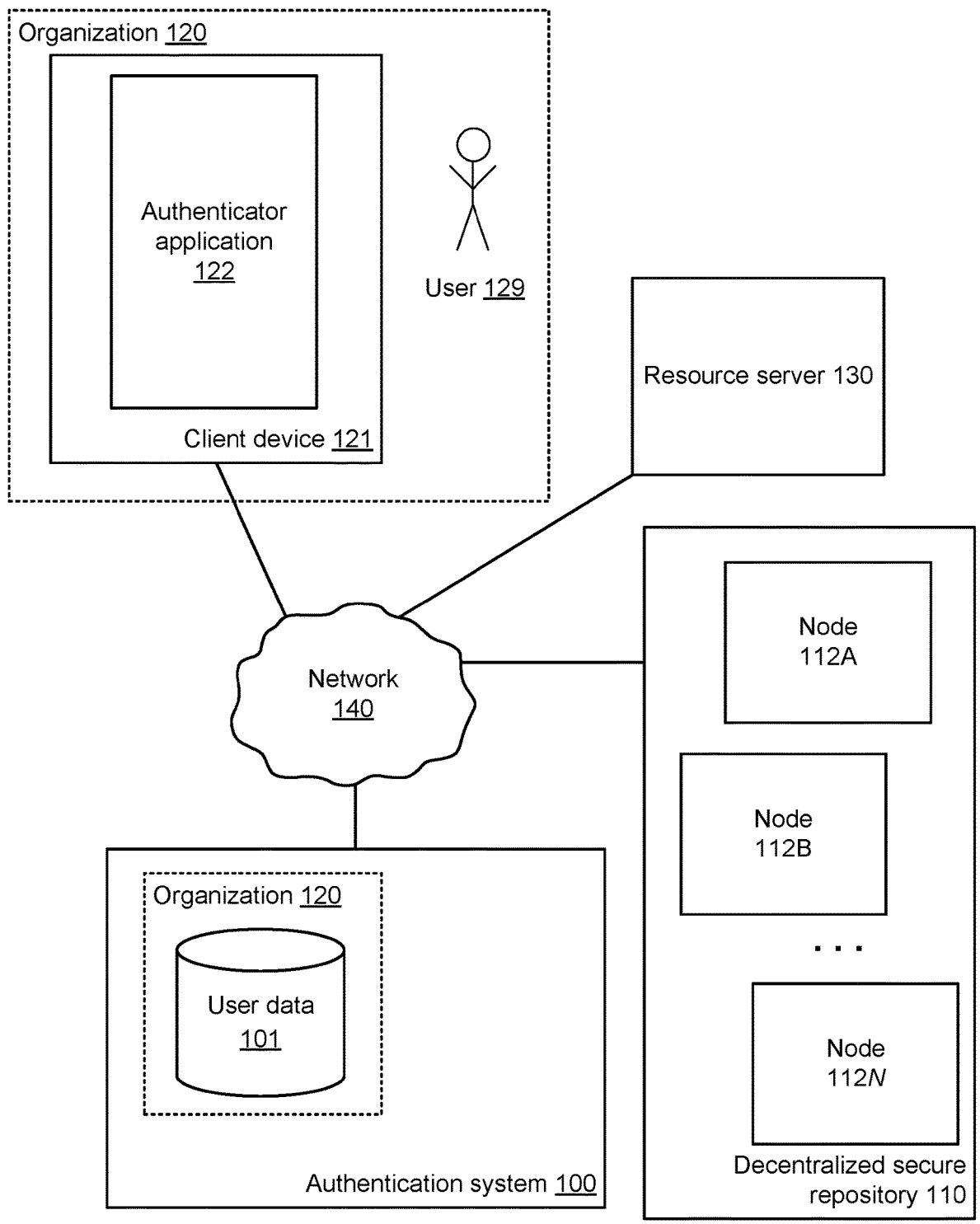
FIG. 1 illustrates one embodiment of a computing environment in which users use a client computing device to obtain access to authenticated resources over a network, according to some embodiments

FIG. 1 illustrates one embodiment of a computing environment in which users use a client computing device to obtain access to authenticated resources over a network, according to some embodiments. The users may be affiliated with an organization (e.g., employees or volunteers of the organization) and may access the resources on behalf of the organization. The users may have multiple accounts on different systems, and the resources that the users access may be owned and/or administered by different independent entities, such that the users may have a number of different identities—and corresponding credentials—across the different systems. The different accounts may provide the users with access to different resources, such as (for example) applications (e.g., email applications, timekeeping applications, spreadsheet applications, etc.), databases, file systems, or the like. Such applications could be, for example, entirely web-based and accessible through a web browser, or could be accessible through a native application installed on the user's client device and communicating with a remote application server. Since each application or other resource could be from a different provider each of which could have a different identity for a user—a single user will typically have many different identities and associated credentials corresponding to the different resources that the user uses. However, for purposes of the invention, a user may only have a single account with a single corresponding identity. An authentication system verifies the identities of users and, if successfully verified, provides them with an authentication token that they can provide to a resource server as proof of their identity and hence of their permission to access requested resources. The authentication system offers MFA authentication, with OTP being one type of factor that a user may elect to use; a decentralized secure repository is used as a medium by which to securely convey an OTP issued by the authentication system to the client device of a user. These entities are now described in more detail.

The organization 120 is an entity, such as a business, a school, a governmental agency, or the like, that has a number of affiliated users 129, such as employees or volunteers. The organization also has one or more client devices 121 that the users 129 use to access resources on behalf of the organization. In other embodiments, the users are not affiliated with an organization, but instead act independently using client devices 121 belonging to them.

The resource server 130 provides access a resource, such as a web-based application (e.g., MICROSOFT OFFICE 365™), a service, a database, a document, or the like. The resource server 130 may be on a server separate from the systems of the authentication system 100, the organization 120, or the decentralized secure repository 110, or it may be part of any of the other systems. The resource server 130 requires authentication of users before the users may gain access to any or all of its resources, and (in embodiments in which the resource server 130 is independent of the authentication system 100) the resource server 130 accepts tokens of authentication from the authentication system 100 as establishing user identity.

The authentication system 100 authenticates the identity of the user 129, granting the user some proof of authentication, such as an authentication token, upon successful verification. The authentication system 100 offers multi-factor authentication (MFA), including the use of one-time passwords (OTP). The authentication system 100 stores user data 101 that include a set of identities of known users with accounts on the authentication system 100. The user data 101 may include a form of identity on the authentication system 100 such as a username, as well as other credential data associated with a user, such as a user password or information derived therefrom. The user data 101 may also include many other types of data about users, such as the factor types and providers that the users may use when seeking identity verification from the authentication system 100, their role(s) or group(s) within the organization 120 to which they belong (e.g., "Engineering", "Legal", "Manager 2", "Director", or the like), and/or the resources to which they have access (e.g., third-party applications 110 such as SALESFORCE, MICROSOFT OFFICE 365, SLACK, or the like), as some examples. The user data 101 may also include identities and credentials of the various users on the various accounts to which they have access, thereby linking a user's identity on the authentication system 100 to the user's identities on those different accounts and (by extension) permitting access to those accounts. For users using OTPs for MFA, the user data 101 also include a public key of the user used to encrypt specific user OTPs, as is described in more detail later below. In some embodiments, the authentication system 100 is part of the organization 120, rather than being an independent entity as it is in other embodiments.

Software on the client device 121 facilitates user authentication by securely and transparently communicating with the authentication system 100 that primarily handles the authentication, and by providing any resulting authentication tokens to a resource server 130 whose resources the user is attempting to access. In this way, the users of the organization 120 simply and securely obtain access to the resources that they need. Such software on the client device 121 may (although need not) be provided by the entity responsible for the authentication system 100. In some embodiments (such as that depicted in FIG. 1), the software is an authenticator application 122, a locally-installed application. In such embodiments, the authenticator application 122 may have a graphical user interface that the user 129 uses to specify data used to authenticate the user to the authentication system 100. For instance, the authenticator application 122 could display text fields or other data entry areas for specifying a username and password of the user 129, a drop-down list or other menu of types of MFA factors to use for authentication (e.g., biometrics, physical tokens, push notifications, or OTP), or the like. Based on the data and/or selections specified by the user 129 in the user interface, the authenticator application 122 communicates with the authentication system 100 to authenticate the user on the authentication system 100. In other embodiments, the authenticator application 122 is implemented as plugin for another application, such as a plugin for a blockchain wallet application.

In some embodiments, the authentication system 100 includes single sign-on (SSO) functionality that—once the user has been authenticated—allows the authentication system to transparently log a user in to the different accounts or other resources to which the user has access. For example, for a given user who has logged in to the authentication system 100, the authentication system can look up the user's accounts or other resources within the user data 101, as well as the user's credentials for those accounts. Using the credentials, as well as metadata or other information about the accounts, authentication system 100 can automatically log the user into the applications or other resources described in the user data 101, such as by establishing application sessions with the various applications and providing corresponding session data (e.g., session tokens) to the device 121. Thus, with a single login to the authentication system 100, the SSO functionality of the authentication system provides a user with automatic access to all the user's accounts or other resources.

In one embodiment, during a prior enrollment phase the user 129 is enrolled on the client device 121 so as to be permitted (among other things) to be authenticated by authentication system 100 when OTP is used within MFA authentication. During this enrollment, a <public, private> keypair is generated. The private key is stored securely on the client device 121, such as by secure enclave hardware isolated from the operating system kernel, and the public key is provided to the authentication system 100 and stored in the user data 101 in association with the user and the client device. The public key may then be used to encrypt data for the user 129/client device 121 (such as an OTP), which the client device can decrypt using the private key; similarly, the private key may then be used to generate a signature, and the public key to verify the signature.

When a user 129 elects OTP as a factor type to use for MFA, the authentication system 100 uses a decentralized secure repository 110 as a secure medium for providing an OTP that it grants to the client device 121 of the user 129. The decentralized secure repository 110 has a number of properties that enhance security of the OTP. For example, the decentralized secure repository 110 is made up of a number of different systems ("nodes") controlled by different organizations, and an attacker would need to successfully attack multiple ones of the nodes (e.g., a majority thereof) in order to gain the ability to tamper with the OTP system. In some embodiments, the decentralized secure repository 110 requires users to apply a digital signature (e.g., using the private key mentioned above) before adding data (such as an OTP) to the decentralized secure repository. In some embodiments, the decentralized secure repository additionally provides the ability for users to "audit" the use of the system—that is, to obtain a log or other information about the actions that have been performed on the decentralized secure repository. Accordingly, if an attacker has somehow managed to use the decentralized secure repository (e.g., to obtain an OTP for the user), the user is able to determine that by auditing the decentralized secure repository.

In one embodiment, the decentralized secure repository 110 is implemented via a blockchain protocol, in which a sequence of blocks (records) is linked together into a chain, with blocks storing hashes of prior blocks. The data of the blocks is replicated across a number of the independent systems participating in the blockchain. As a consequence of the use of hashes of prior blocks, and of replication across independent systems, the data in the blockchain cannot be modified absent large-scale collusion between the independent systems, making it effectively tamper-proof. In order for attackers to gain control of the blockchain, they would need to successfully attack a majority of the independent systems, which is infeasible in practice. This is an advantage relative to conventional MFA systems that provide OTP, in which attackers need only gain access to a single system— the system distributing the OTP, such as email or text servers—in order to access the OTP. Since blockchain protocols also retain all the data for the blockchain (including accesses, as discussed later), it is guaranteed that a user can "audit" the use of the blockchain in perpetuity to see how the user's OTPs in the blockchain were used. This compares favorably to conventional authentication systems, in which the organization administering the authentication system may periodically delete older authentication data, so that users have no guarantees that they will be able to determine what occurred in prior authentications of their identities.

The decentralized secure repository 110 stores data (such as the OTPs used for user authentication), and also code for accessing that data. (In embodiments in which the decentralized secure repository 110 is implemented using a blockchain, this represents a smart contract.) The code provides an API used for accessing the data, including at least a function that writes an (encrypted) OTP to the blockchain in association with user data identifying the given user (such as a user ID, or other form of data that unambiguously identifies the user), and a function that reads the (encrypted) OTP from the blockchain. In some embodiments, the API also includes an auditing function that provides information (e.g., a log) of all the authentication transactions stored in the decentralized secure repository 110 for a given user (e.g., those performed with the "write OTP" and "read OTP" functions of the API). Thus, in such embodiments, the code for accessing the data of the decentralized secure repository 110 implements the API for the functions:

writeOTP(userID, encryptedOTP), where userID is a unique user identifier for the user on whose behalf the function is called, and encryptedOTP is the encrypted form of the OTP. In some embodiments, a transaction ID can be provided as an additional argument, which facilitates performing multiple authentications within the same time window (e.g., logging into both a desktop computer and a mobile/tablet computer within the span of a few minutes).

readOTP(userID). In some embodiments, a transaction ID may be provided, as discussed directly above.

getAuditLog(userID).

Physically, the organization 120 is made up of a number of computing systems, including the various client devices 121; one or more internal networks that connects the computing systems, including routers or other networking devices that define the boundary between the organization and external networks; and the like.

Similarly, the authentication system 100, although depicted as a single logical system in FIG. 1, may be implemented using a number of distinct physical systems and the connections between them, such as application servers, database servers, load-balancing servers, routers, and the like.

Likewise, the decentralized secure repository 110 is composed of a number of independent systems (nodes), each of which may have its own internal sub-systems, networks, and the like.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

Figure 2:
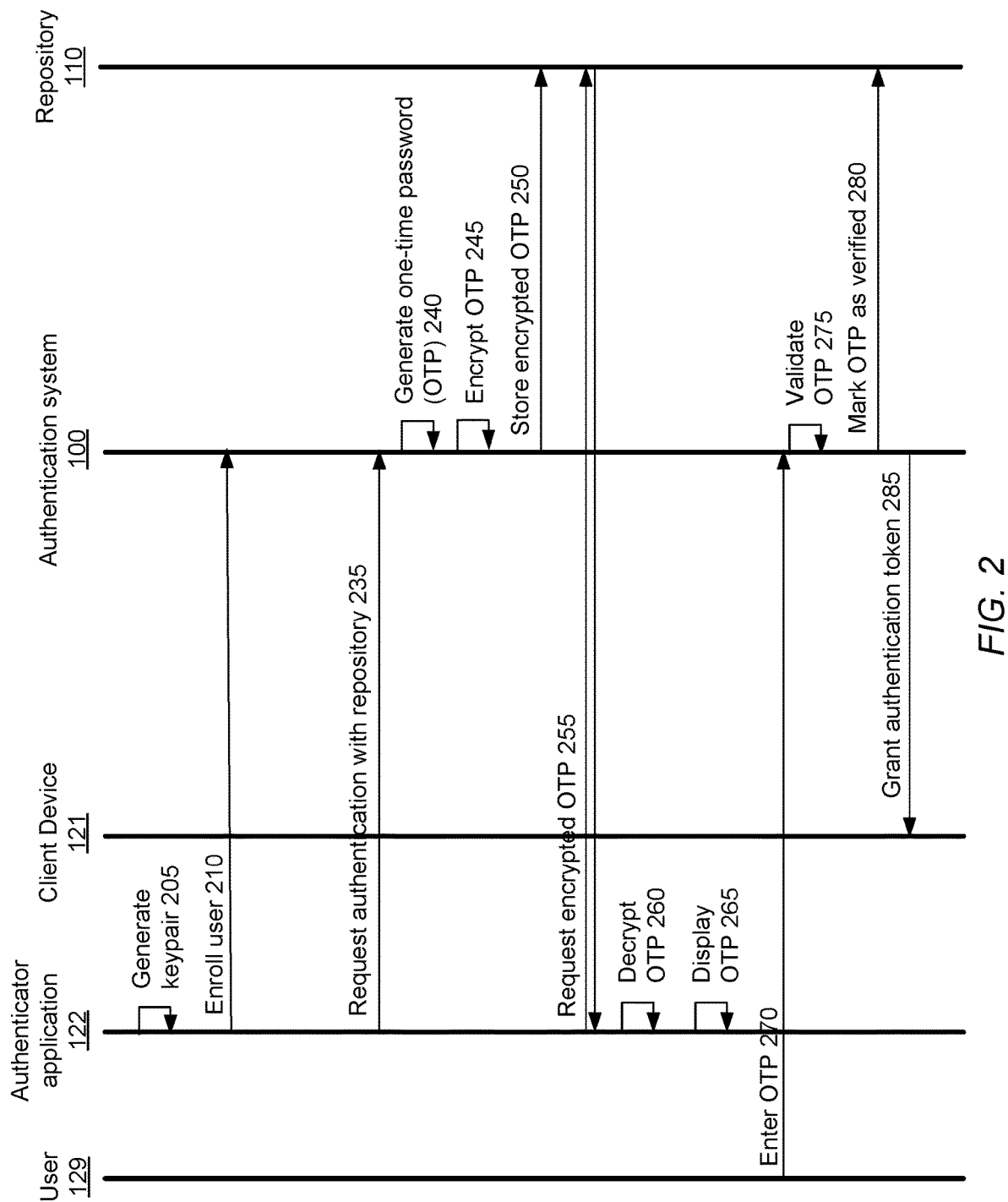
FIG. 2 illustrates interactions between a user and the user's client device, the authenticator application, the authentication system 100, and the decentralized secure repository 110, when authenticating using a one-time password, according to some embodiments.

FIG. 2 illustrates interactions between a user 129 and the user's client device 121, the authenticator application 122, the authentication system 100, and the decentralized secure repository 110, when authenticating using a one-time password, according to some embodiments.

During a preliminary enrollment phase, the user 129 and the user's client device 121 are enrolled with the authentication system 100. The authenticator application 122 running on the client device 121 generates 205 a <public, private> keypair for the user (e.g., for a cryptosystem based on discrete logarithm, elliptic curves, or the like) and enrolls 210 the user with the authentication system 100. As part of the enrollment, the public key portion of the keypair is sent to the authentication system 100, where it is stored in the user data 101 in association with an identity of the user 129.

At some later time, the user 129 seeks access to some resource on a resource server 130 that requires authentication of users before it provides access to the resources. For example, the user 129 may be attempting to log on to an account of an online service provided by the resource provider 130 (which can also be part of the authentication system 100 itself, e.g., for an account for obtaining single sign-on services), to access a database or file system, or the like. Alternatively, the user 129 or authenticator application 122 may request authentication, independent of an access to a resource.

The authenticator application 122 determines that the authentication should involve an OTP, e.g., because the user 129 explicitly indicated in the user interface of the authenticator application that the user wished to use OTP as an additional security factor. Accordingly, the authenticator application 122 requests 235 the authentication system 100 to use the decentralized secure repository 110 to securely provide OTP authentication for the user 129. The authentication system 100 generates 240 a particular OTP for the user 129, such a random number or other code. Since the OTP will be distributed via the decentralized secure repository 110, which can be read by many different people, the authentication system 100 encrypts 245 the OTP in a user-specific manner by using the public key for the user as provided during the enrollment step 210. The authentication system then stores 250 the encrypted OTP on the decentralized secure repository 110, where it can be accessed by other systems. For example, the authentication system 250 may call the writeOTPCodeForKey( ) function described above to accomplish the storing 250.

As a further part of the authentication request, the authenticator application 122 requests 255 the encrypted OTP from the decentralized secure repository 110, e.g., by calling the readOTPCode( ) function described above (either directly, or indirectly—such as by using a plugin such as for a Bitcoin or other cryptocurrency wallet), and the decentralized secure repository 110 accordingly provides the encrypted OTP to the authenticator application 122. The authenticator application 122 decrypts 260 the encrypted OTP using the private key of the user 129 generated during step 205, and displays 265 the decrypted OTP within a user interface so that the user can see it. The user 129 accordingly enters 270 the OTP into a user interface, such as a web-based user interface provided by the authentication system 100 and prompting the user to enter the OTP that the authentication system sent to the user for the current access request. The user accordingly enters 270 the OTP into the user interface.

The authentication system 100 receives the OTP from the user's client device 121 and validates 275 the received OTP by comparing it to the OTP generated at step 240 for the user 129. If the received and generated OTPs match, then the OTP portion of the user authentication is validated.

In some embodiments, the authentication system 100 marks 280 the OTP as verified by storing an indicator of verification in the decentralized secure repository 110 in association with the user. This indicator can be later used for purposes such as auditing or fraud detection. For example, the authentication system 100 could provide a user interface to show recent transactions, such as OTP verifications, which the user could peruse to note any irregularities. As another example, an automated process could identify and notify a user of any irregularities (e.g., OTP verifications by systems having different characteristics—such as IP address, location, or browser type or version—than those that the user is known to have).

If all the required steps of authentication have been met (e.g., a username and password, and any other additional factors, have been successfully provided), then the authentication system 100 determines that the user 129 is authenticated, and it grants 285 and provides an authentication token to the client device 121 of the user 129. The authentication token identifies the user and indicates that the user was authenticated by the authentication system 100, and the client device 121 can provide the authentication token to the resource server 130 to serve as proof that the user 129 is valid and that the resource server 130 can therefore properly grant the requested access.

In some alternate embodiments, the entry of the OTP is automatic, rather than performed manually by the user. For example, the OTP may be obtained securely by a secondary client device of the user 129, such as a user's smart phone, and provided automatically to the client device 121 by a secure means such as local wireless. In such embodiments, step 265 may be omitted, and step 270 is performed automatically and transparently.

At any later point, the user 129 may use the auditing features of the decentralized secure repository to determine how the user's OTPs were used. For example, if somehow a different user had managed to obtain access to the user's OTP (e.g., via a social engineering technique), the auditing would allow the user to determine that fact.

In such a scheme, malicious attackers could not directly obtain the OTP of the user because the OTP is provided to the client device 121 of the user 129 in end-to-end encrypted form, including being stored in encrypted form on the decentralized secure repository 110.

Figure 3:
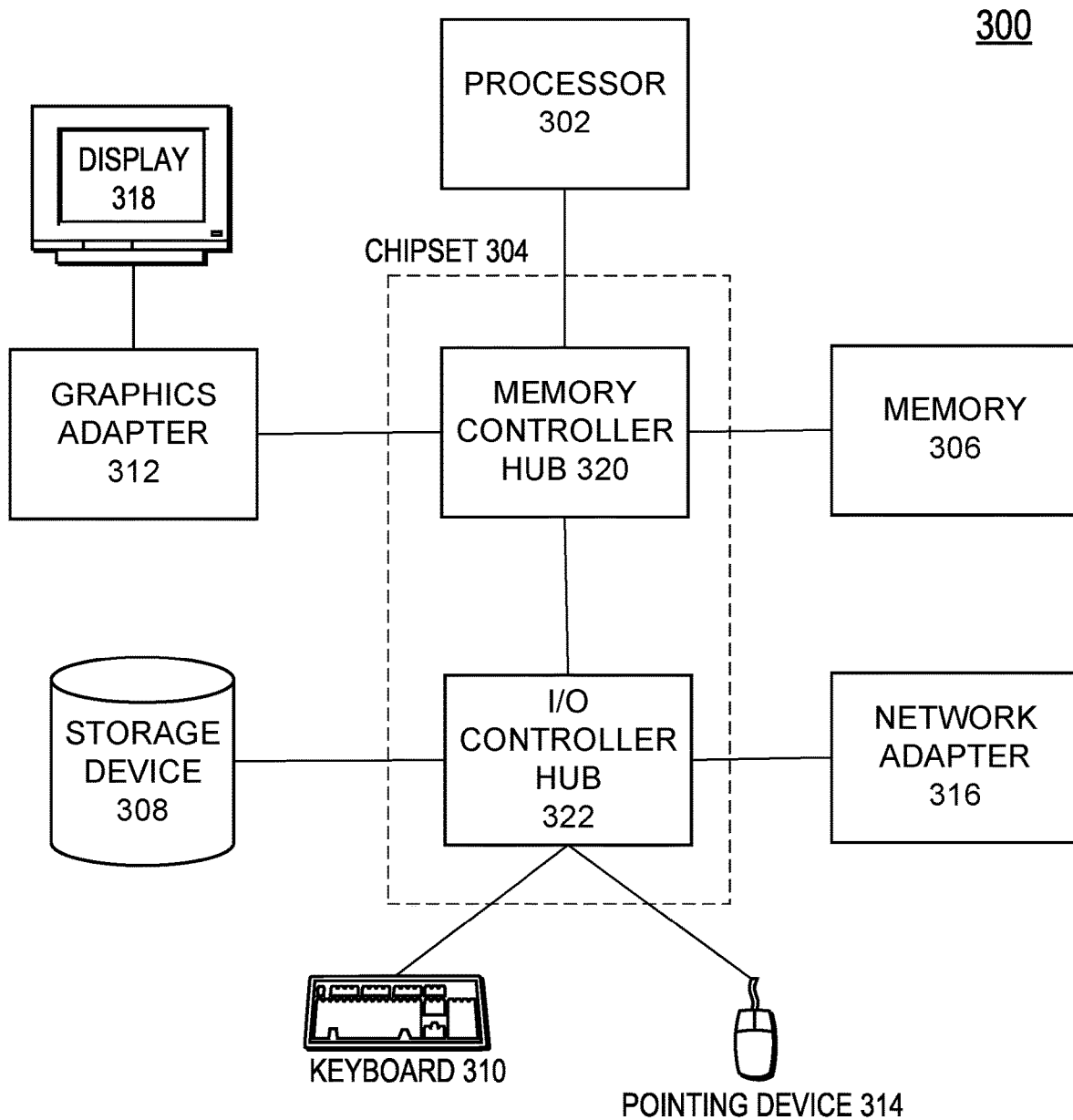
FIG. 3 is a high-level block diagram illustrating physical components of a computer used as part or all of (for example) the authentication system, the client device, the resource server, and/or the decentralized secure repository of FIG. 1, according to one embodiment.

FIG. 3 is a high-level block diagram illustrating physical components of a computer 300 used as part or all of (for example) the authentication system 100, the client device 121, the resource server 130, and/or the decentralized secure repository 110, according to one embodiment. Illustrated are at least one processor 302 coupled to a chipset 304. Also coupled to the chipset 304 are a memory 306, a storage device 308, a graphics adapter 312, and a network adapter 316. A display 318 is coupled to the graphics adapter 312. In one embodiment, the functionality of the chipset 304 is provided by a memory controller hub 320 and an I/O controller hub 322. In another embodiment, the memory 306 is coupled directly to the processor 302 instead of the chipset 304.

The storage device 308 is any non-transitory computer-readable storage medium, such as a hard drive, compact disk read-only memory (CD-ROM), DVD, or a solid-state memory device. The memory 306 holds instructions and data used by the processor 302. The graphics adapter 312 displays images and other information on the display 318. The network adapter 316 couples the computer 300 to a local or wide area network.

As is known in the art, a computer 300 can have different and/or other components than those shown in FIG. 3. In addition, the computer 300 can lack certain illustrated components. In one embodiment, a computer 300 acting as a server may lack a graphics adapter 312, and/or display 318, as well as a keyboard 310 or pointing device 314. Moreover, the storage device 308 can be local and/or remote from the computer 300 (such as embodied within a storage area network (SAN)).

As is known in the art, the computer 300 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 308, loaded into the memory 306, and executed by the processor 302.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method of authentication using one-time passwords distributed via a decentralized secure repository, the computer-implemented method comprising:
    generating, by a client device of a user, a keypair of the user consisting of a private key and a public key corresponding to the private key;
    registering, by the client device, the public key with an authentication system in association with an identifier of the user;
    requesting, from the authentication system by the client device, to authenticate the user using an authenticator application on the client device and the decentralized secure repository comprising a distributed peer-to-peer storage system;
    requesting, from the decentralized secure repository by the authenticator application on the client device, an encrypted one-time password (OTP) that is stored on the decentralized secure repository by the authentication system, wherein requesting the encrypted OTP is responsive to the request by the client device to authenticate the user using the authenticator application and the decentralized secure repository;
    receiving, at the authenticator application from the decentralized secure repository, the encrypted OTP responsive to the request by the authenticator application for the encrypted OTP, wherein the encrypted OTP is stored on the decentralized secure repository prior to the receiving the encrypted OTP at the authenticator application;
    decrypting, by the authenticator application using the private key of the user, the encrypted OTP into a decrypted OTP;
    sending the decrypted OTP to the authentication system;
    receiving an authentication token from the authentication system responsive to the sending; and
    using the authentication token to gain access to a resource of a resource server using the authentication system for authentication.

2. The computer-implemented method of claim 1, wherein the decentralized secure repository comprises code implementing an application programming interface (API) containing functions for:
    writing an OTP for a given user identifier; and
    reading an OTP for a given user identifier.

3. The computer-implemented method of claim 2, wherein the API further contains a function for obtaining auditing information comprising a complete list of every call to the API function to write an OTP associated with the user or to the API function to read an OTP associated with the user.

4. The computer-implemented method of claim 1, wherein the decentralized secure repository stores the encrypted OTP using blockchain techniques.

5. A computer-implemented method of authentication performed by an authentication system using one-time passwords distributed via a decentralized secure repository, the computer-implemented method comprising:

receiving, from a client device of a user, a public key of the user;

registering the public key in association with an identifier of the user;

receiving, from the client device, a request to authenticate the user using the decentralized secure repository;

generating a one-time password (OTP) for the user;

generating an encrypted OTP by encrypting the OTP with the public key of the user;

sending a request to the decentralized secure repository to store the encrypted OTP, whence the client device may obtain the encrypted OTP, the decentralized secure repository comprising a distributed peer-to-peer storage system;

receiving the OTP from the client device, responsive to the client device sending a request to the decentralized secure repository to obtain the encrypted OTP, wherein the encrypted OTP is stored on the decentralized secure repository prior to the receiving the OTP from the client device;

comparing the received OTP to the generated OTP;

responsive to the received OTP matching the generated OTP, generating an authentication token for the user; and sending the authentication token to the client device.

6. The computer-implemented method of claim 5, wherein the decentralized secure repository comprises code implementing an application programming interface (API) containing functions for:

writing an OTP for a given user identifier; and reading an OTP for a given user identifier.

7. The computer-implemented method of claim 6, wherein the API further contains a function for obtaining auditing information comprising a complete list of every call to the API function to write an OTP associated with the user or to the API function to read an OTP associated with the user.

8. The computer-implemented method of claim 5, wherein the decentralized secure repository stores the encrypted OTP using blockchain techniques.

9. An authentication system comprising:

a computer processor; and a non-transitory computer-readable storage medium storing instructions that when executed by the computer processor perform actions comprising:

receiving, from a client device of a user, a public key of the user;

registering the public key in association with an identifier of the user;

receiving, from the client device, a request to authenticate the user using a decentralized secure repository;

generating a one-time password (OTP) for the user;

generating an encrypted OTP by encrypting the OTP with the public key of the user;

sending a request to the decentralized secure repository to store the encrypted OTP, whence the client device may obtain the encrypted OTP, the decentralized secure repository comprising a distributed peer-to-peer storage system;

receiving the OTP from the client device, responsive to the client device sending a request to the decentralized secure repository to obtain the encrypted OTP, wherein the encrypted OTP is stored on the decentralized secure repository prior to the receiving the OTP from the client device;

comparing the received OTP to the generated OTP;

responsive to the received OTP matching the generated OTP, generating an authentication token for the user; and sending the authentication token to the client device.

10. The authentication system of claim 9, wherein the decentralized secure repository comprises code implementing an application programming interface (API) containing functions for:

writing an OTP for a given user identifier; and reading an OTP for a given user identifier.

11. The authentication system of claim 10, wherein the API further contains a function for obtaining auditing information comprising a complete list of every call to the API function to write an OTP associated with the user or to the API function to read an OTP associated with the user.

12. The authentication system of claim 9, wherein the decentralized secure repository stores the encrypted OTP using blockchain techniques.

\* \* \* \* \*